(12) United States Patent
Avalle

(10) Patent No.: US 7,128,567 B2
(45) Date of Patent: Oct. 31, 2006

(54) MACHINE FOR THE MANUFACTURE OF LIPSTICKS OR SIMILAR

(75) Inventor: Nadia Avalle, Montana sur Sierre (CH)

(73) Assignee: Intercos S.p.A. (IT)

( * ) Notice: Subject to any disclaimer, the term of this patent is extended or adjusted under 35 U.S.C. 154(b) by 284 days.

(21) Appl. No.: 10/600,289

(22) Filed: Jun. 20, 2003

(65) Prior Publication Data
US 2004/0137101 A1   Jul. 15, 2004

(30) Foreign Application Priority Data
Jan. 10, 2003   (IT)   .......................... MI2003A0030

(51) Int. Cl.
*B29C 41/20*   (2006.01)
(52) U.S. Cl. ...................... 425/803; 425/440; 425/556; 425/576; 425/DIG. 32
(58) Field of Classification Search ........ 425/DIG. 32, 425/440, 803, 576, 577, 556; 249/127, 137
See application file for complete search history.

(56) References Cited

U.S. PATENT DOCUMENTS

| | | | |
|---|---|---|---|
| 3,978,568 A * | 9/1976 | Frydlender | 29/38 A |
| 4,082,491 A * | 4/1978 | Clymer et al. | 425/440 |
| 4,172,113 A | 10/1979 | Featherstone et al. | |
| 4,543,702 A * | 10/1985 | Wada | 29/434 |
| 5,057,259 A * | 10/1991 | Parmelee | 264/166 |
| 6,022,209 A * | 2/2000 | Kuo | 425/440 |
| 6,632,080 B1 * | 10/2003 | Kok et al. | 425/346 |
| 2002/0160075 A1 * | 10/2002 | Bazzo et al. | 425/549 |

FOREIGN PATENT DOCUMENTS

| | | |
|---|---|---|
| DE | 44 42 197 C | 2/1996 |
| FR | 2 443 324 A | 7/1980 |
| FR | 2 729 278 A | 9/1996 |
| JP | 06 271426 A * | 9/1994 |

\* cited by examiner

*Primary Examiner*—Joseph S. Del Sole
*Assistant Examiner*—Maria Veronica Ewald
(74) *Attorney, Agent, or Firm*—Akerman Senterfit

(57) ABSTRACT

Machine for the manufacture of lipsticks or similar, comprising a mobile support (1) for a plurality of housings (8) for flexible moulds (14) that are fillable with cosmetic product, said mobile support (1) being movable through a plurality of working positions comprising a position (17) for heating the flexible moulds, a position (18) for filling the flexible moulds with poured cosmetic product and a position (19) for cooling said poured cosmetic product. Said heating position (17) comprises means for the introduction of warm heating air into said moulds and said cooling position (19) comprises mould cooling means that operate by convection of cold air.

7 Claims, 11 Drawing Sheets

MACHINE FOR THE MANUFACTURE OF LIPSTICKS OR SIMILAR

The present invention concerns a machine for the manufacture of lipsticks or similar.

A process has now been known for a long time, in particular from Fr-A-2443324, for the manufacture of lipsticks or similar cosmetic products, that substantially provides the use of a flexible mould shaped as a finger, that after appropriate heating receives a pre-established quantity of cosmetic product in the molten state, that gets subsequently cooled until it assumes a solid shape. At that point at least one part of the flexible mould that is near its filling mouth gets stretched by means of application of vacuum from its outside and a case for lipstick or similar is introduced in said stretched part in order to pick up the solidified cosmetic product, while the mould is maintained in position, still by means of application of vacuum.

Scope of the present invention is to provide a machine capable to carry out in fast sequence all the stages of the process above described, starting from the pouring of the molten product and ending with the positioning of the solidified cosmetic product inside its case.

According to the invention such scope is attained with a machine for the manufacture of lipsticks or similar, comprising a mobile support for a plurality of housings for flexible moulds that are fillable with cosmetic product, said mobile support being movable through a plurality of working positions comprising a position for heating the flexible moulds, a position for filling the flexible moulds with poured cosmetic product and a position for cooling said poured cosmetic product, characterised in that said heating position comprises means for the introduction of warm heating air into said moulds and said cooling position comprises mould cooling means that operate by convection of cold air.

An embodiment of such machine comprises in particular:

a first and a second carousel placed one next to the other one and comprising respective annular horizontal plates revolving around respective parallel vertical axes, in which:

the annular plate of the first carousel is provided with housings for flexible moulds that are fillable with molten cosmetic product;

the annular plate of the second carousel is provided with housings for cases for the collection of solidified cosmetic product;

the first carousel comprises along the run of the respective annular plate the sequence of a zone for the introduction of warm air into said flexible moulds for heating the same, a zone for pouring molten cosmetic product inside said flexible moulds, a cooling zone operating by convection of cold air for said flexible moulds and the cosmetic products poured into them and a zone for the insertion of said cases inside said flexible moulds and around the cosmetic products contained therein and for the subsequent extraction of said cases with relative cosmetic products locked into them;

the second carousel comprises along the run of the respective annular plate a zone for the picking up and transfer of said cases from said housings of the second carousel into said flexible moulds of the first carousel and for the return of said cases with inserted cosmetic products from said flexible moulds to said housings of the second carousel and a zone for the completion of the insertion of the cosmetic products into said cases.

Said embodiment of the machine according to the present invention is illustrated as a non limiting example in the enclosed drawings, in which.

Figure 1:
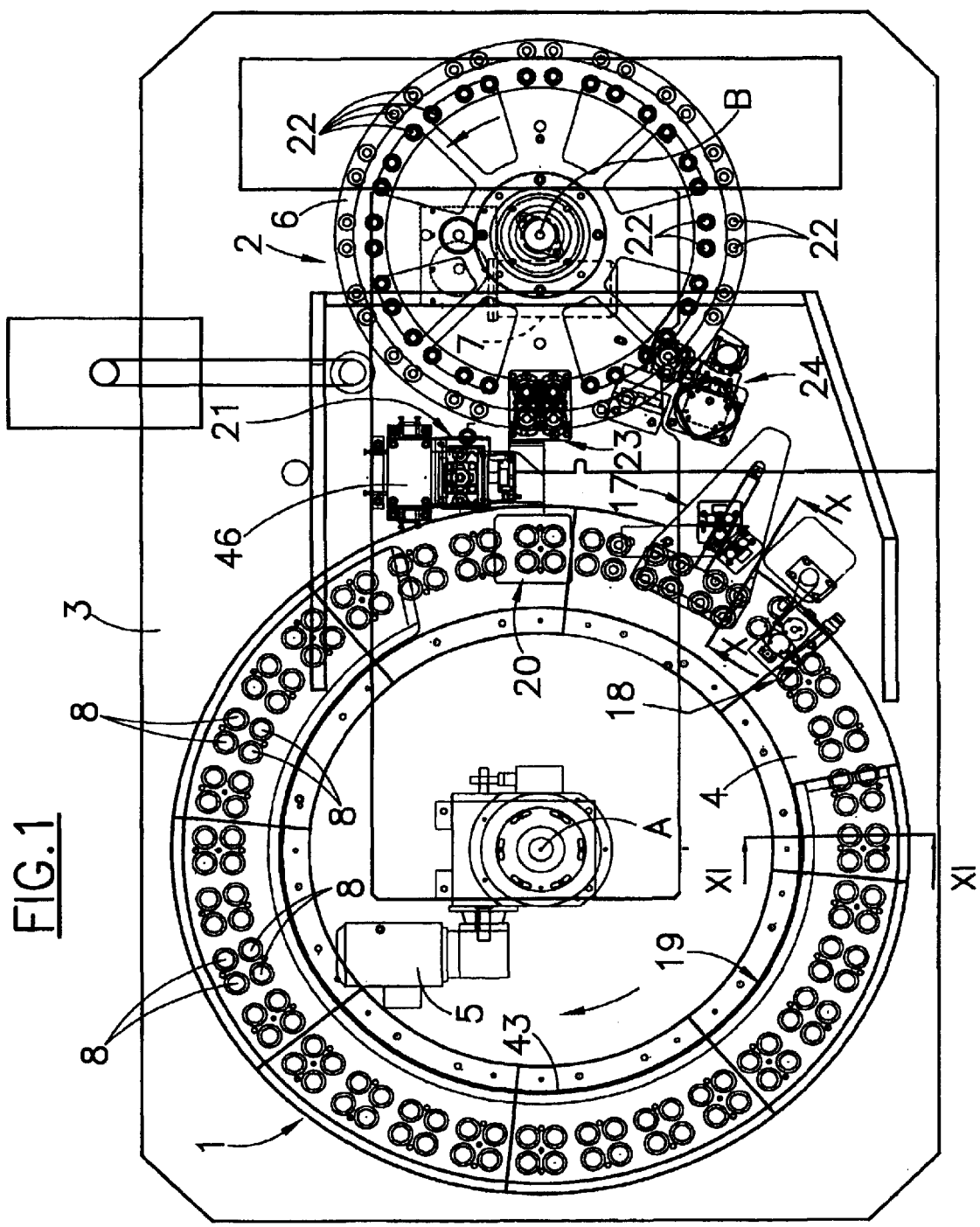
FIG. 1 shows in top plan the ensemble of a machine according to the present invention.

As shown in FIG. 1, the machine comprises a first and a second carousel 1 and 2 mounted onto a single base 3.

The first carousel 1 comprises an annular horizontal plate 4 that gets rotated in subsequent steps around a first vertical axis A by an electric motor 5.

The annular plate 4 comprises a sequence of groups of four housings 8 for flexible moulds destined to receive and to form respective cosmetic products.

Figure 2:
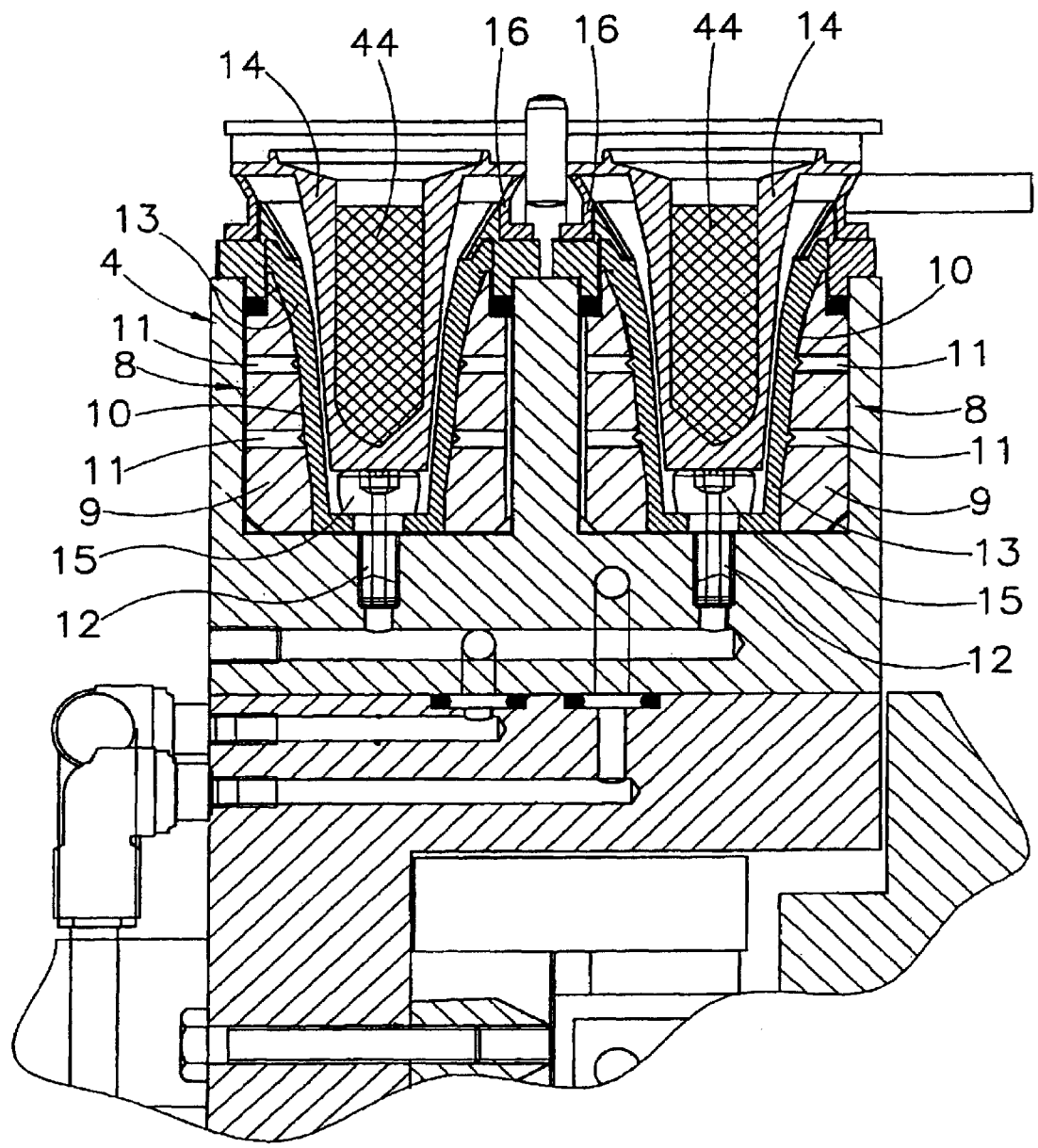
FIG. 2 shows the vertical section magnified detail of housings for flexible moulds that are provided in the revolving plate of the first carousel, said housings being shown in the condition in which they are after the filling of the flexible moulds with poured cosmetic products.

Two of such housings 8 are shown in magnified scale in FIG. 2, where one can see to house a rigid block 9 provided with internal cavity 10 communicating laterally and on the bottom with passages 11 and 12 connectable with a vacuum source, a flexible hollow membrane 13 housed inside said cavity 10 and having substantially the same shape, and a flexible mould 14, substantially shaped as a finger, inserted in loose way inside said membrane 13 and resting at the bottom on a spacer 15 and at the top on a tapered top mouth 16 of said housing.

The carousel 1 comprises in sequence along the run of its revolving plate 4 a zone 17 in which a device for the input of warm air into the flexible moulds 14 operates, a zone 18 in which a device (known per se) for the pouring of molten cosmetic product into the flexible moulds 14 operates, a zone 19 in which a device for the cooling of the flexible moulds 14 operates and a zone 20 in which a gripping unit 21 (described in details hereinafter) operates that is destined to the insertion of cases for cosmetic products into said flexible moulds 14 and around the cosmetic products contained therein and to the subsequent extraction of said cases with relative cosmetic products stuck into them.

Figure 10:
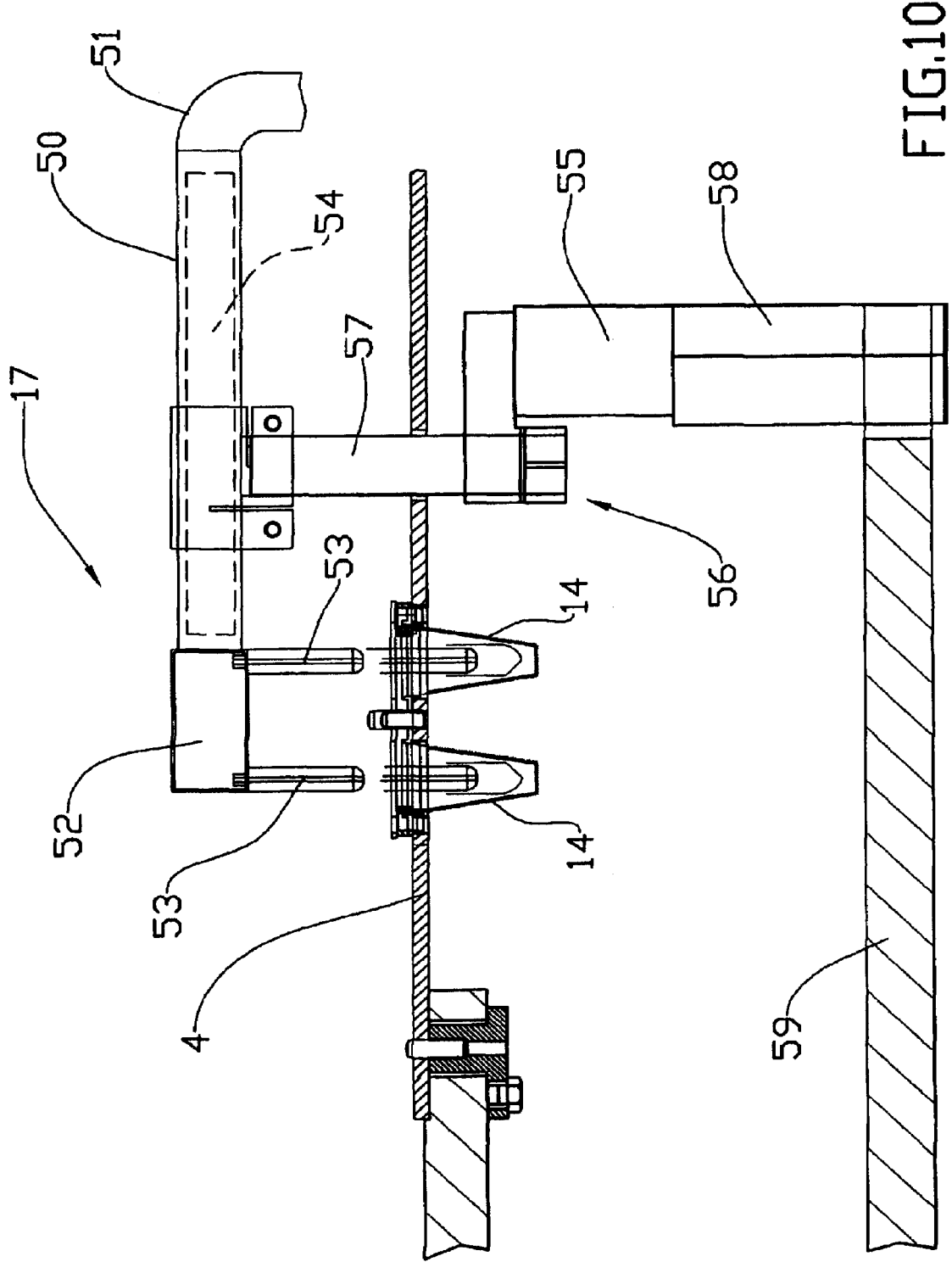
FIG. 10 shows a magnified section along line X—X in FIG. 1.

The zone 17, where the heating of the flexible moulds 14 takes place, is very evident in FIG. 10, and it comprises a main tube 50 that connects an air feeding hose 51 with a collector 52 which supports a plurality of small tubes 53 (eight in the example herein illustrated), that convey the heated air into the flexible moulds 14.

The air being utilised is introduced as cold by means that are not shown into the flexible duct 51 and it gets heated by means of a resistance 54 controlled by thermocouple, located inside the main tube 50.

The small tubes 53 can move vertically, inside and outside of the flexible moulds 14, integrally with the collector 52 and with the main tube 50, owing to a hydraulic cylinder 55 bound to said main tube 50 by means of a support 56 including an upright 57. A cylindrical support 58, bound to a frame 59, supports said hydraulic cylinder 55.

Figure 11:
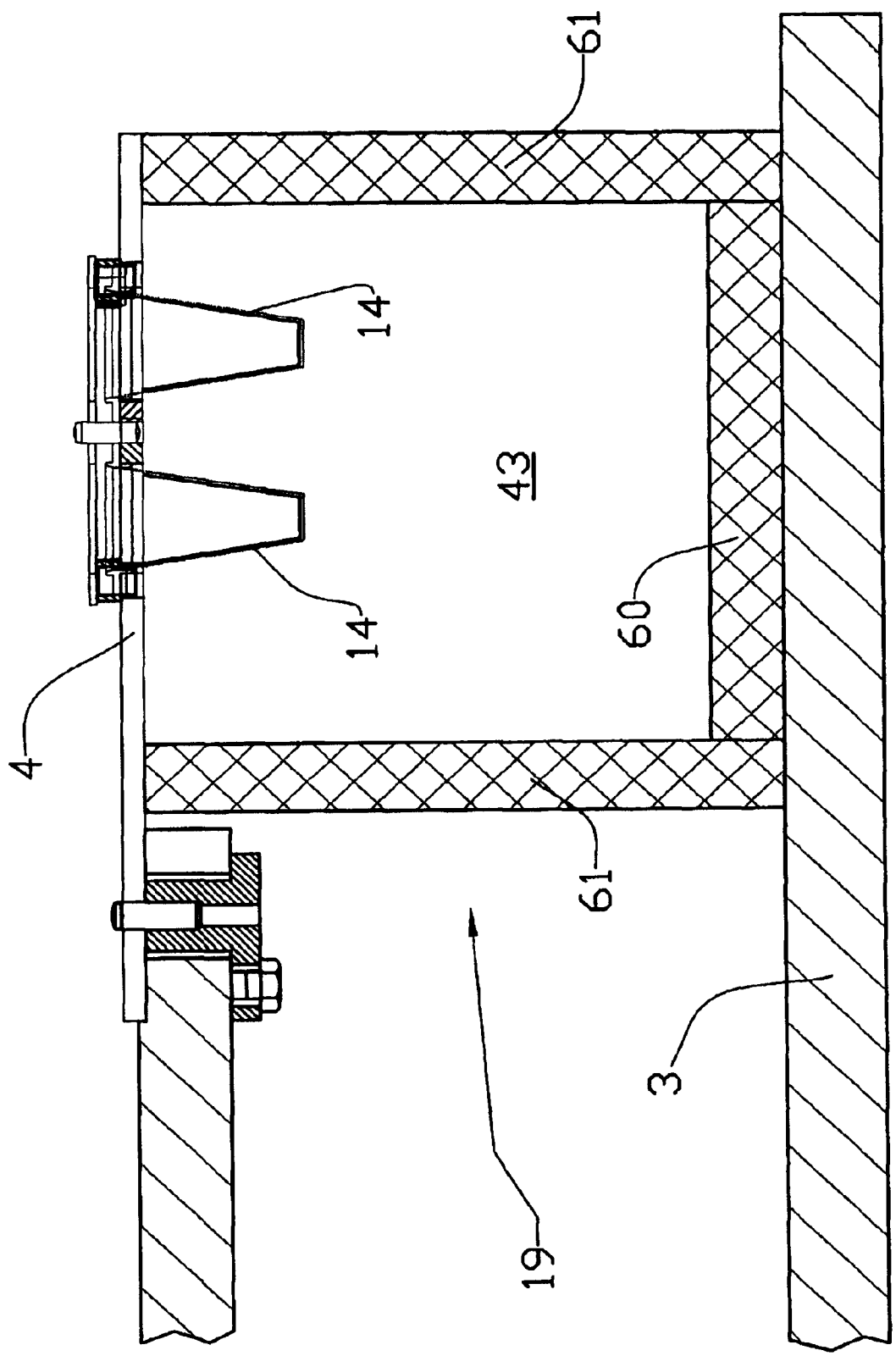
FIG. 11 shows a magnified section along line XI—XI in FIG. 1.

The cooling zone 19, shown in turn in FIG. 11, is made up of a box 43 made of a plane 60 and side-walls 61, closed on top by the annular plate 4 supporting the flexible moulds 14 filled with product to be cooled.

Said box 43, containing opportunely cooled air, extends circularly under the carousel 1 by an angle of approximately 270° (FIG. 1).

The second carousel 2 comprises in turn an annular horizontal plate 6, with smaller diameter than the first one, that gets rotated in subsequent steps around a second vertical axis B by an electric motor 7 that is synchronised with the motor 5.

The annular plate 6 comprises a sequence of groups of four housings 22 for cases destined to receive the cosmetic products.

The carousel 2 comprises in sequence along the path of its revolving plate 6 a zone 23 in which the aforesaid gripping unit 21 operates for the picking up and the transfer of the cases from said housings 22 into said flexible moulds 14 of the first carousel 1 and for the return of said cases with inserted cosmetic products from said flexible moulds 14 to said housings 22 of the second carousel 2 and a zone 24 in which a device (that will be described hereinafter) operates for the complete insertion of the cosmetic products inside said cases.

Figure 4:
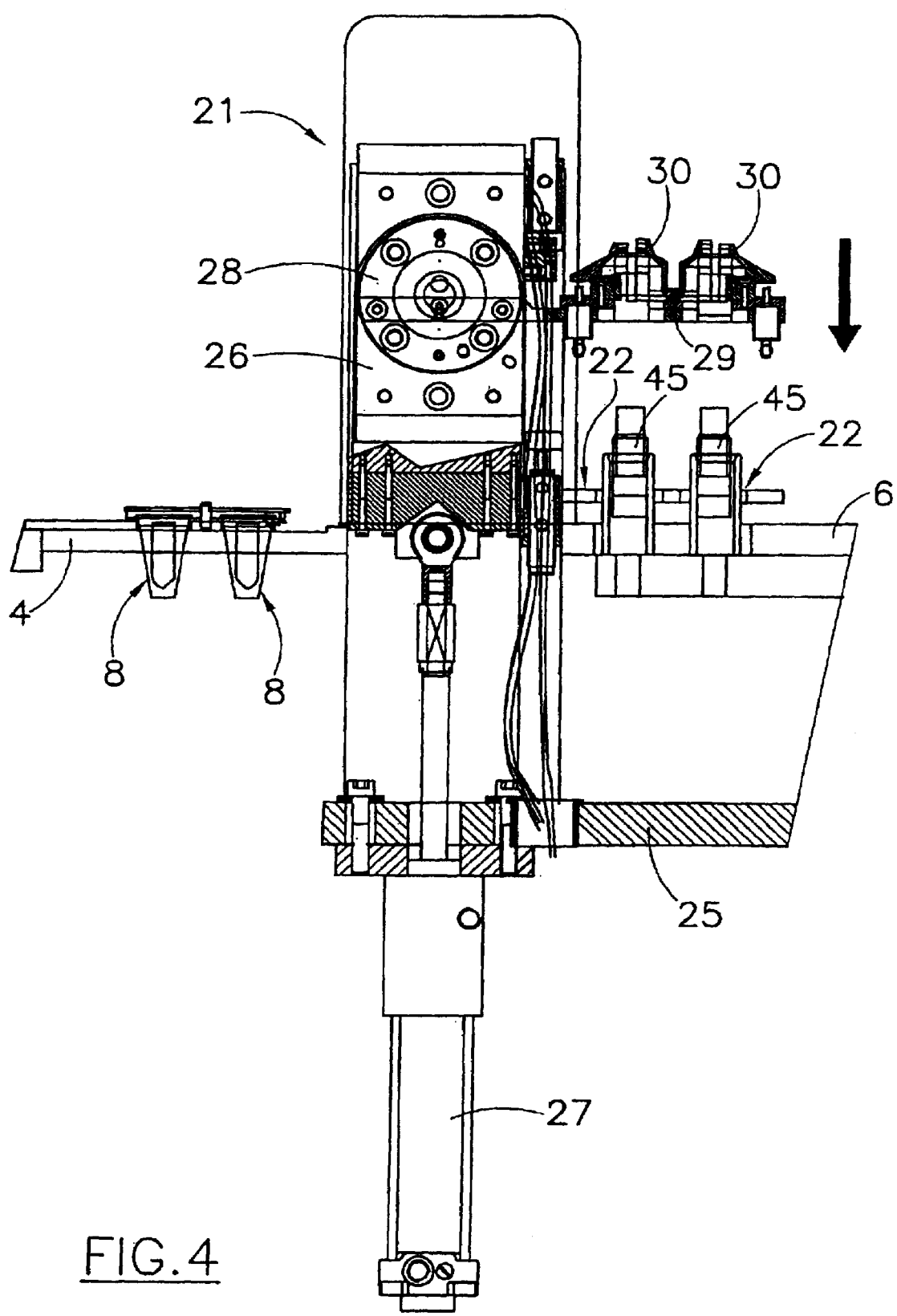
FIGS. 4–8 show in subsequent working stages the vertical section magnified detail of a gripping unit that provides to the transfer of the cases for cosmetic products from the second to the first carousel and vice-versa.

The gripping unit 21 is shown in greater details in FIG. 4, where it can be seen as comprising a supporting structure 25 fastened to the base 3, a head 26 vertically movable under the control of a pneumatic cylinder 27, a revolving hub 28 set in operation by a motor 46 and an arm 29 with tongs 30 fastened to said hub 28 so as to be able to carry out turnovers by 180° (and vice-versa) as regards the position shown in FIG. 4.

Figure 9:
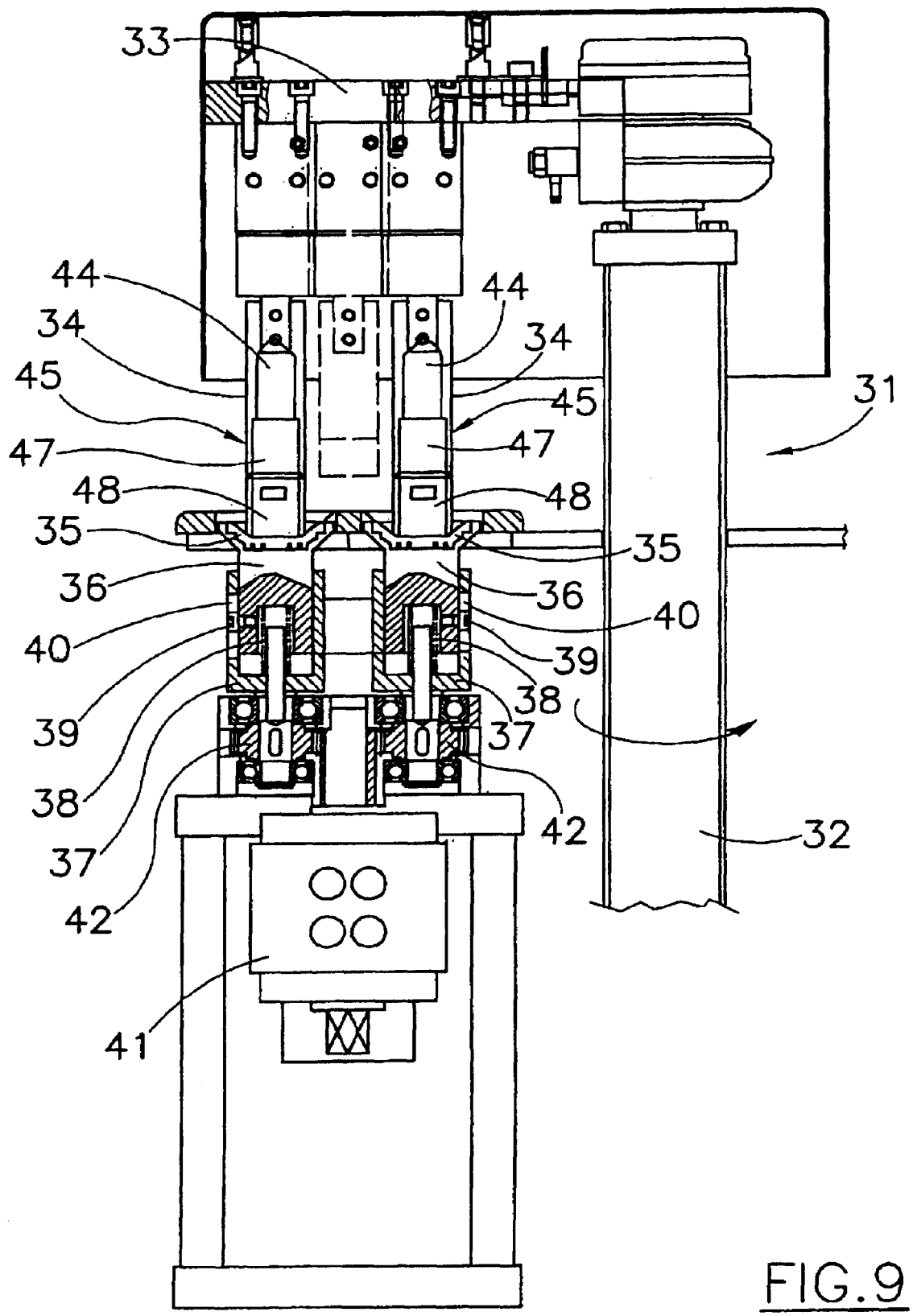
FIG. 9 shows the vertical section magnified detail of a device that provides to the completion of the insertion of the cosmetic products into the cases after their picking up from said flexible moulds.

In FIG. 9 the device that in zone 24 of the second carousel 2 completes the insertion of the cosmetic products inside their cases is shown in details. The device of FIG. 9, indicated as a whole by number 31 and conceived essentially for lipsticks, comprises a column 32 revolving around a vertical axis and in addition movable vertically, that bears a laterally cantilevered head 33 provided with gripping tongs 34 for the top part of the cases. The device 31 comprises in addition bearing surfaces 35 for the base of the cases and said bearing surfaces 35 extend at the bottom with supporting tangs 36 that are slidingly housed inside respective cylinders 37, where they can slide vertically under the thrust 38 of springs and the guide of pins 39 that are inserted in vertically elongated slots 40 of the cylinders 37. An electric motor 41 can control through gears 42 the rotation of the cylinders 37 around their axis.

During operation, the rotary plate 4 of the carousel 1 takes progressively various groups of housings 8 with flexible moulds 14 inserted into them to the heating zone 17, where the warm air gets insufflated into the flexible moulds 14, thus causing their heating. Subsequently the same groups of housings 8 are taken in the filling zone 18, where the desired cosmetic product is poured in the molten state inside the previously heated flexible moulds 14. The same groups of housings 8 with flexible moulds 14 filled with molten cosmetic product cover a long path inside the cooling zone 19 where the air contained in the box 43 removes heat by convection from the flexible moulds 14 and the cosmetic product poured into them, that therefore attains the solid state, shown and indicated by 44 in FIG. 2.

Once the cooling is over, the groups of housings 8 with solidified cosmetic products inside of the flexible moulds 14 reach the zone 20, in which the gripping unit 21 operate.

Figure 5:
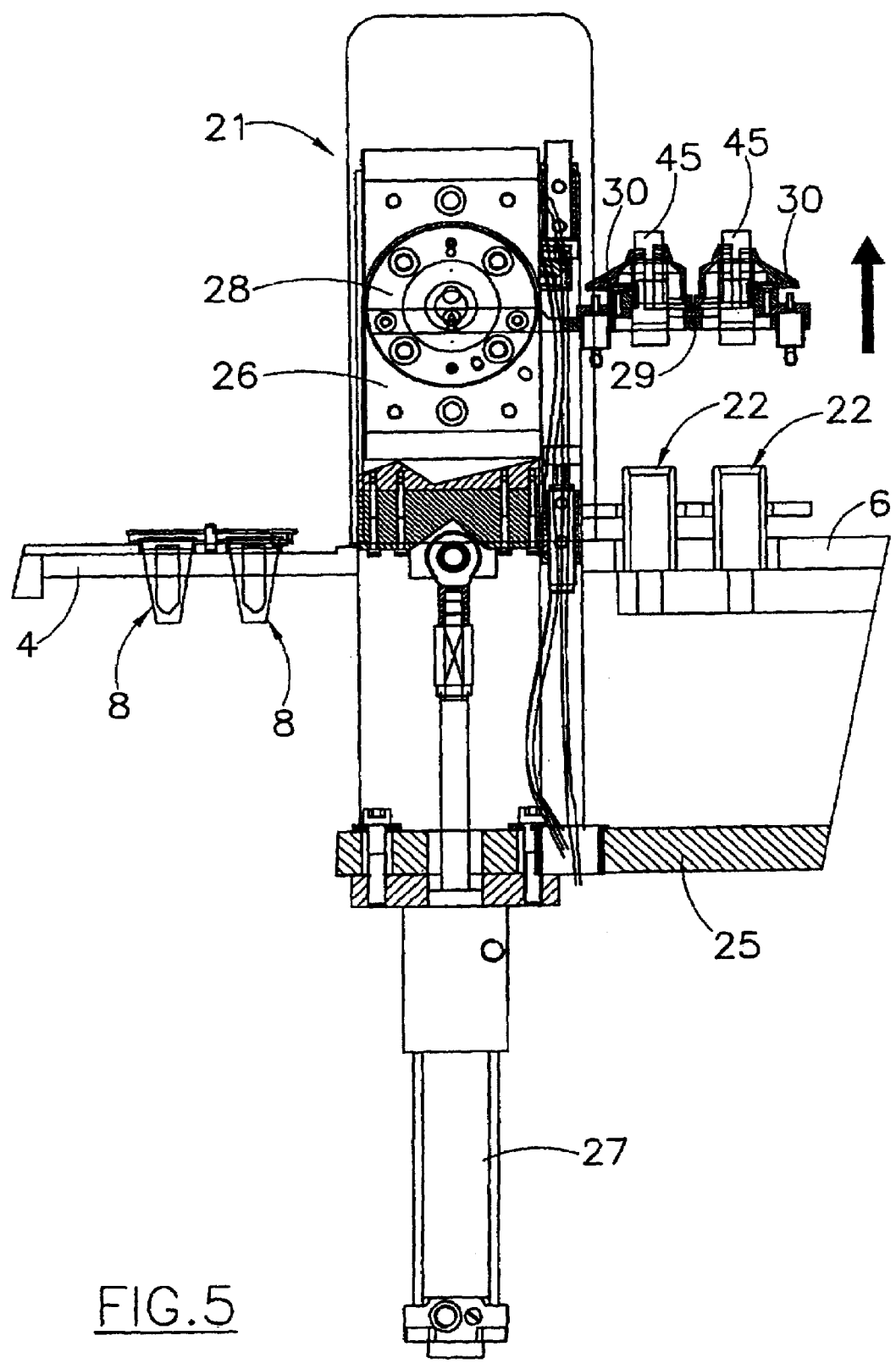

The latter, that when at rest is in the position in FIG. 4, is thus put in operation in order to lower the arm 29 with tongs 30 over a group of housings 22 in which cases 45 destined to receive the cosmetic products (lipsticks or similar) produced by the carousel 1 are housed. The tongs 30 get hold of the cases 45 and the arm 29 is lifted back by the cylinder 27, as shown in FIG. 5.

Figure 6:
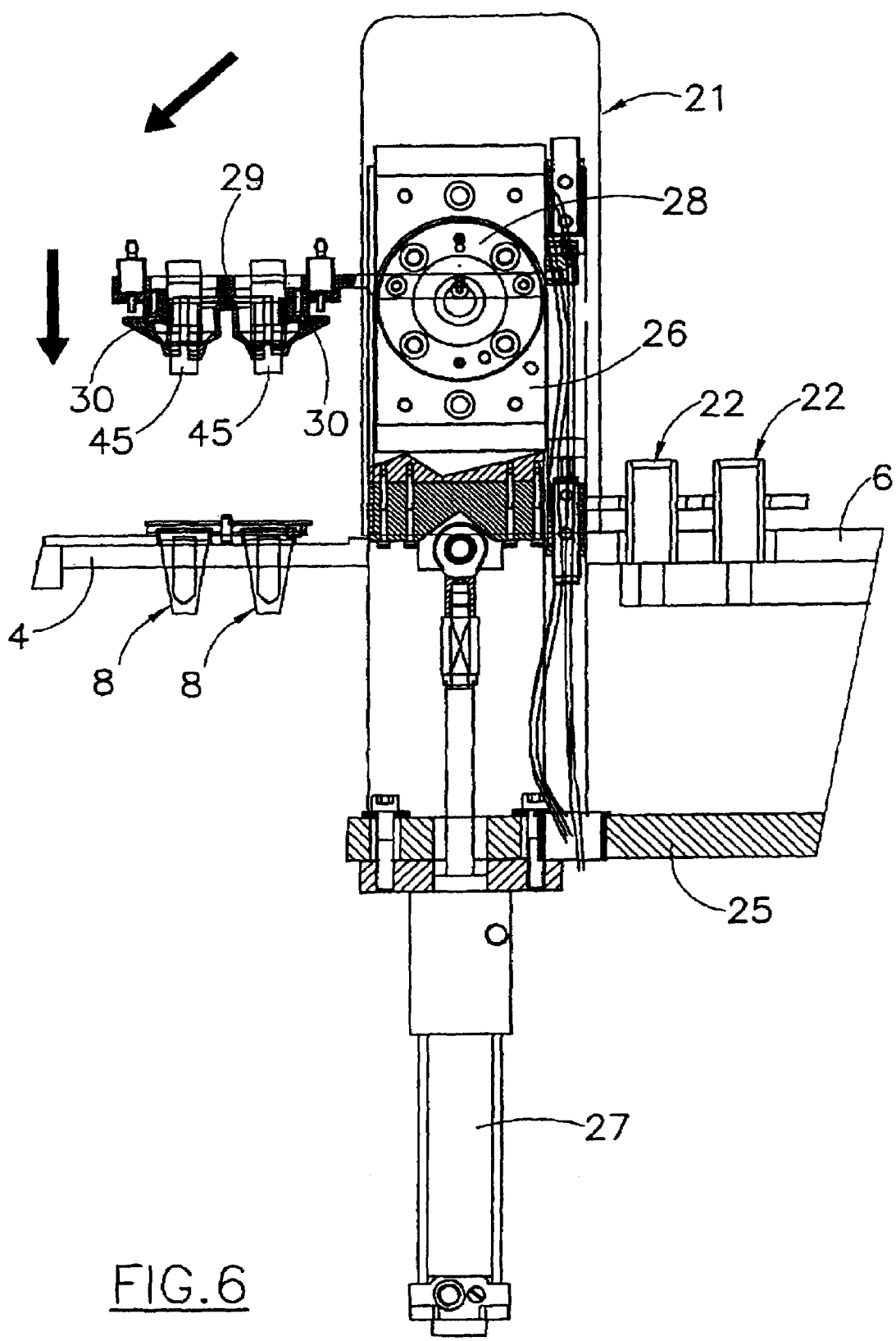

Subsequently the hub 28 is made rotate by 180° so as to turn over by 180° the arm 29 into the position of FIG. 6, in which the cases 45 are in a position overhanging respective housings 8 and with the mouth toward the housings 8.

Figure 3:
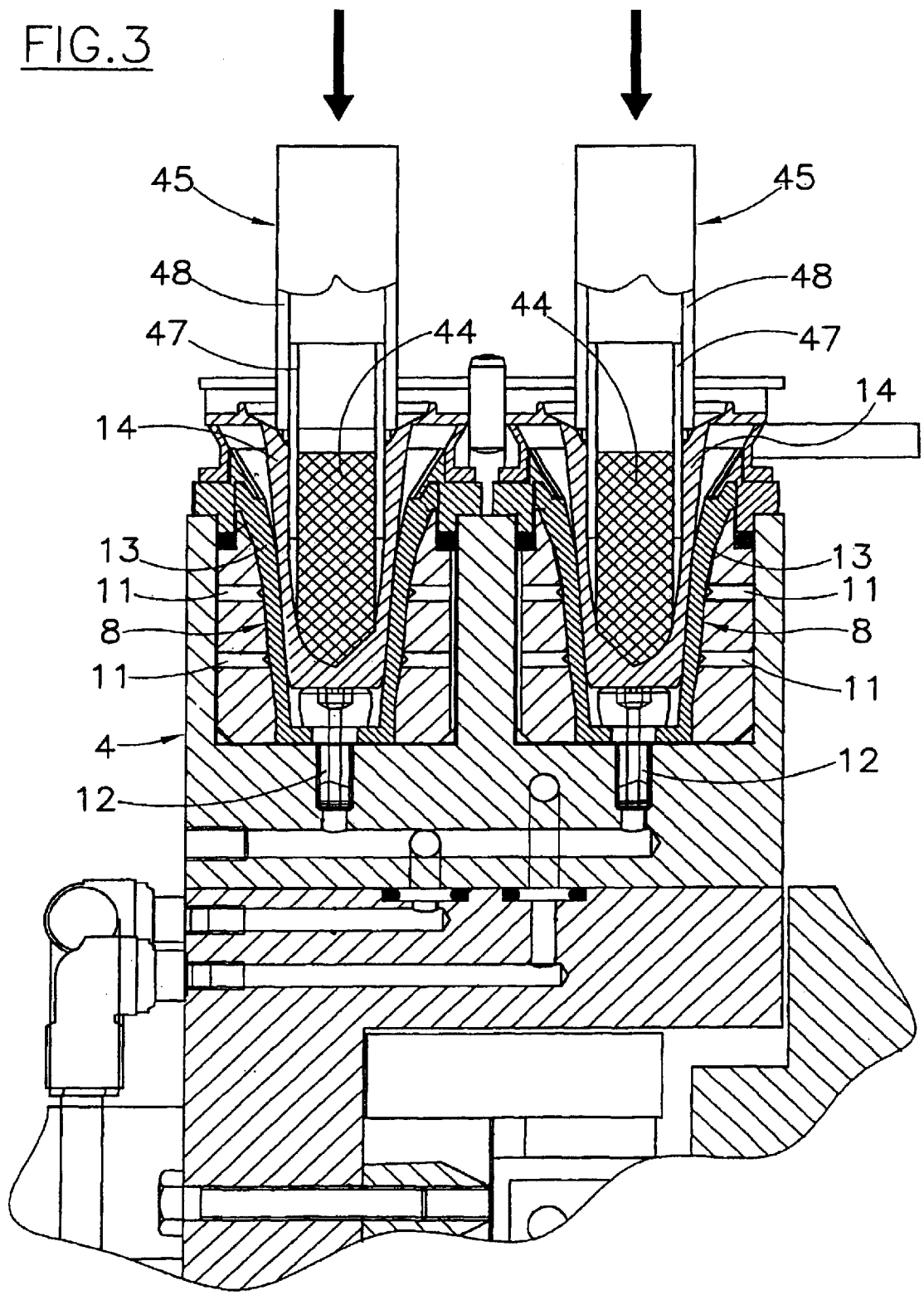
FIG. 3 shows a section view similar to the one in FIG. 2 during the stage of input of the cases into said flexible moulds for the picking up of the poured cosmetic products.

The arm 29 with the cases 45 withheld by the tongs 30 comes down and in the meantime in the passages 11 of the housings 8 a depression is thus created that through the membranes 13 causes the spreading apart of the top part of the flexible moulds 14, that adhere to the membranes 13 and leave inside the moulds 14 the space necessary to allow an internal part 47 of the cases 45, axially projecting from the external part 48, to penetrate into the moulds 14 and locate itself in a forced way around the cosmetic products 44, as shown in FIG. 3.

Figure 7:
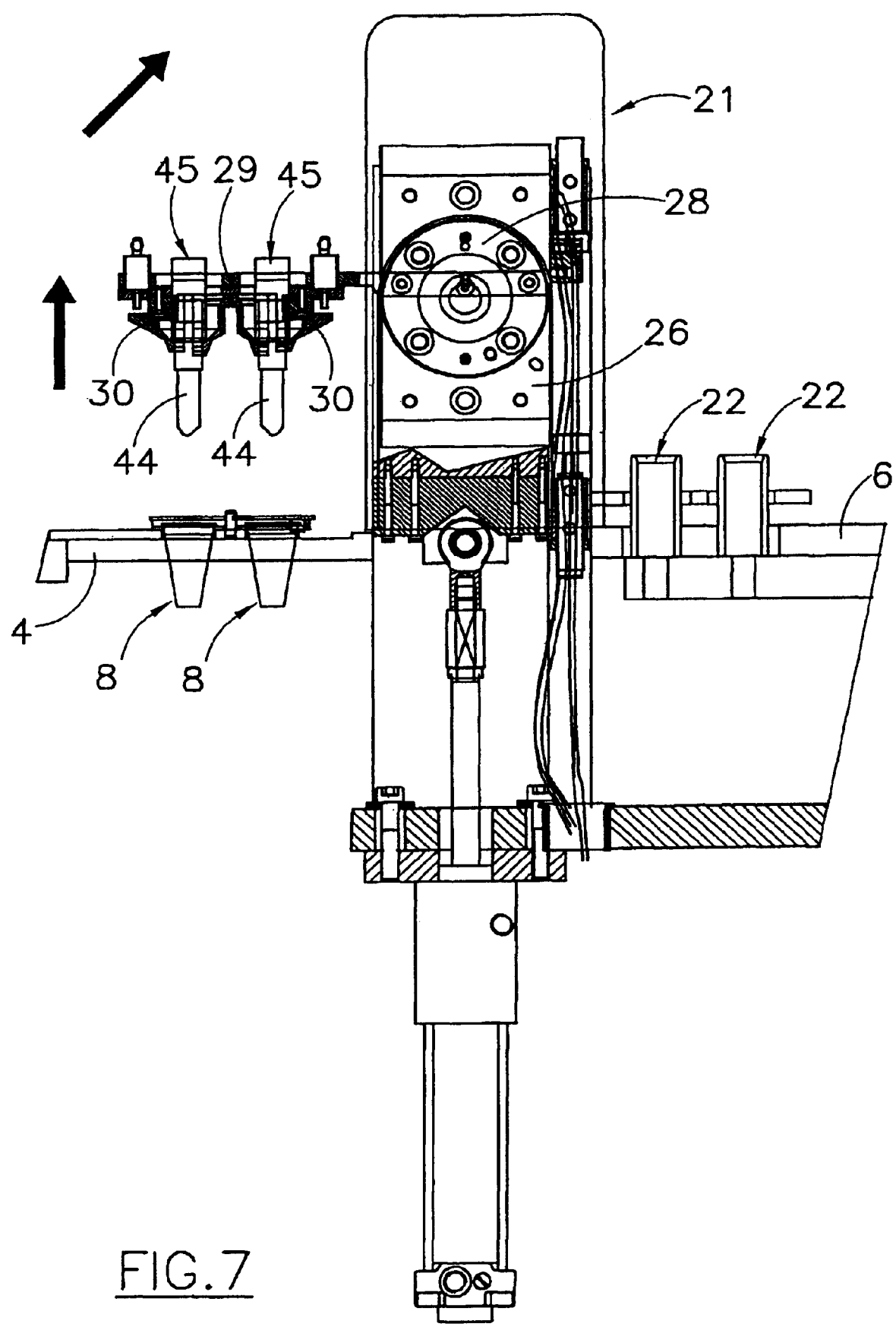

Subsequently a depression is also created in the passages 12, due to which the flexible moulds 14 are withheld inside the membranes 13, and therefore of the housings 8, while the arm 29 of the gripping unit 21 lifts back while carrying with it the cases 45 with the cosmetic products inserted and stuck into the internal parts 47 of the cases (FIG. 7).

Figure 8:
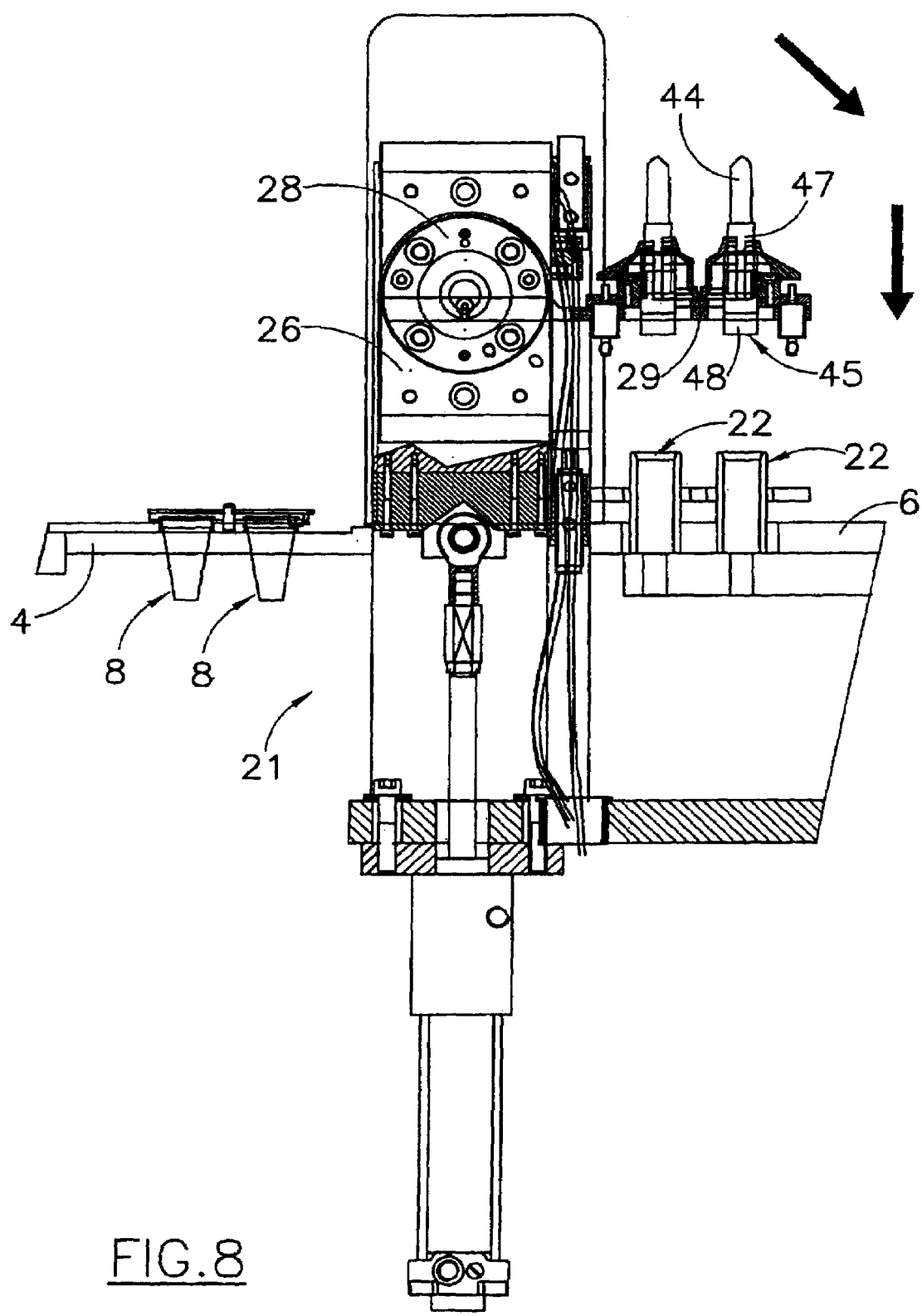

The subsequent turning over of the arm 29 (FIG. 8) takes the tongs 30 with the cosmetic cases 45 and products 44 above the housings 22 of the annular plate 6 of the carousel 2, where the cases 45 get inserted with the external part 48 arranged downward, the internal part 47 arranged upward and partially extracted and the cosmetic product 44 inserted into the internal part 47 and extending upward from it.

The subsequent rotation of the annular plate 6 of the carousel 2 takes the housings 22 thus filled into the station 24, where the device 31 picks up the cases 45 with cosmetic products 44 from the housings 22 by getting hold of the internal parts 47 of the cases with the tongs 34, it takes them above the bearing surfaces 35, it lowers them onto the latter so as to force them toward the bottom against the action of springs 38 and finally puts the cylinders 37 in rotation owing to the motor 41. The combined effect of the rotation of the external parts 48 and the vertical translation of the internal parts 47 causes the screwing of the latter into the external parts 48, therefore the cosmetic products 44 get completely inserted into the cases 45.

Finally the device 31 takes the cases 45 filled with cosmetic product 44 into the housings 22 of the carousel 2, where the same cases are ready to receive respective caps that are applied manually. The production cycle is thus finished.

The invention claimed is:

1. A machine for the manufacture of lipsticks, comprising:
    a first and second carousel located one next to the other and comprising respective annular horizontal plates revolving around respective parallel vertical axes,
    wherein the annular plate of the first carousel is provided with housings for flexible molds that are fillable with molten cosmetic product;
    wherein the annular plate of the second carousel is provided with housings for cases for the collection of solidified cosmetic product;

wherein the first carousel comprises, along the run of its respective annular plate, the sequence of:
- a first zone for heating the flexible molds by the introduction of warm air into said flexible molds,
- a second zone for pouring molten cosmetic product into said flexible molds,
- a third zone for cooling the flexible molds and the cosmetic products poured into them, the cooling zone operating by convection of cold air, and
- a fourth zone for inserting empty cases into said flexible molds and around the cosmetic products contained therein and for the subsequent extraction of said cases with relative cosmetic products inserted therein, and wherein the second carousel comprises, along the run of its respective annular plate,
- a zone for the grasping and transfer of said cases from said housings of the second carousel inside said flexible molds of the first carousel and for the return of said eases with inserted cosmetic products from said flexible molds to said housings of the second carousel, and
- a zone for the completion of the insertion of the cosmetic products inside said cases.

2. The machine according to claim 1, wherein said cooling zone of the first carousel comprises a cooling device comprising air at room temperature that is made circulate inside a box into which said flexible molds are inserted.

3. The machine according to claim 1, wherein a gripping unit is provided between said case insertion zone of the first carousel and said case grasping and transfer zone of the second carousel,
wherein said gripping unit is provided with gripping means for taking empty cases from said housings of the second carousel and inserting them in reversed position inside said flexible molds and around the cosmetic products in the first carousel to form case and cosmetic product assemblies when said housings of the first carousel are in said case insertion zone and then for extracting said ease and cosmetic product assemblies from said housings of the first carousel and transferring them to said housings of the second carousel.

4. The machine according to claim 3, wherein said gripping means comprises:
- a vertically movable head,
- a revolving hub carried by said head and rotatable round an axis in a plane parallel to said annular plates of the first and second carousels; and
- an arm with case grasping tongs fastened to said hub in such a way as to be rotated by 180° around said axis from a position with said tongs superimposed to said housings of the second carousel and a position with said tongs overlapped to said housings of the first carousel, and vice-versa.

5. The machine according to claim 1, wherein said cases comprise an internal part suitable to receive a cosmetic product and an external part that is screwable as regards said internal part for the complete insertion of said internal part and of said cosmetic products inside of said part external and said zone for the completion of the insertion of cosmetic product into said cases comprising a device that is capable to cause the mutual screwing of said internal and external parts of said cases.

6. Machine according to claim 5, wherein said device comprises tongs for the gripping of said internal part of the cases, sprung bearing surfaces for said external part of the cases and revolving means connected with said bearing surfaces in such a way that their rotation causes the axial translation of said bearing surfaces as regards said tongs.

7. Machine according to claim 1, wherein said zone for the heating of the first carousel comprises a main tube, containing a resistance controlled by thermocouple, that connects a hose with a collector that supports small tubes insertable in said flexible molds.

* * * * *